US012794116B2

(12) United States Patent
Li et al.

(10) Patent No.: US 12,794,116 B2
(45) Date of Patent: Nov. 10, 2026

(54) BASE STATION ANTENNA ARRANGEMENT, BASE STATION ANTENNA AND ANTENNA ASSEMBLY FOR BASE STATION ANTENNA

(71) Applicant: Outdoor Wireless Networks LLC, Richardson, TX (US)

(72) Inventors: YueMin Li, Suzhou (CN); Junfeng Yu, Suzhou (CN); PuLiang Tang, Suzhou (CN); Xun Zhang, Suzhou (CN); Jian Liu, Suzhou (CN); Xiaohua Tian, Suzhou (CN); Hangsheng Wen, Suzhou (CN); Nengbin Liu, Suzhou (CN); Jiajia Ni, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 19/213,069

(22) Filed: May 20, 2025

(65) Prior Publication Data

US 2025/0279576 A1 Sep. 4, 2025

Related U.S. Application Data

(63) Continuation of application No. 17/929,403, filed on Sep. 2, 2022, now Pat. No. 12,334,627.

(30) Foreign Application Priority Data

Sep. 29, 2021 (CN) .......................... 202111149349.8

(51) Int. Cl.

*H01Q 1/24* (2006.01)
*H01Q 1/36* (2006.01)
*H01Q 19/10* (2006.01)

(52) U.S. Cl.

CPC ............... *H01Q 1/246* (2013.01); *H01Q 1/36* (2013.01); *H01Q 19/10* (2013.01)

(58) Field of Classification Search

CPC ........... H01Q 1/246; H01Q 1/36; H01Q 19/10
See application file for complete search history.

(56) References Cited

U.S. PATENT DOCUMENTS

| | | | |
|---|---|---|---|
| 11,374,309 | B2 | 6/2022 | Bisiules et al. |
| 2005/0001778 | A1 | 1/2005 | Le et al. |

(Continued)

FOREIGN PATENT DOCUMENTS

| | | | |
|---|---|---|---|
| CN | 206532886 | U | 9/2017 |
| CN | 109659673 | A | 4/2019 |
| CN | 112490629 | A | 3/2021 |

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

(Continued)

*Primary Examiner* — Graham P Smith
(74) *Attorney, Agent, or Firm* — Myers Bigel, P.A.

(57) ABSTRACT

The present application relates to an antenna assembly for a base station antenna, a base station antenna arrangement and a base station antenna. The antenna assembly has a reflector, which has a longitudinal extent, a front side and a rear side opposite the front side, where the front side is configured for radiating elements to be arranged thereon, wherein, the reflector has a first longitudinal section residing in a first plane and a second longitudinal section residing in a second plane that is adjacent to the first longitudinal section, where the first plane is rearward of the second plane. The properties of the base station antenna arrangement and the base station antenna may be improved through the antenna assembly.

20 Claims, 6 Drawing Sheets

(56) References Cited

U.S. PATENT DOCUMENTS

| | | | |
|---|---|---|---|
| 2008/0246681 | A1 | 10/2008 | Deng et al. |
| 2010/0265150 | A1 | 10/2010 | Arvidsson et al. |
| 2014/0159978 | A1 | 6/2014 | Gottl et al. |
| 2015/0244068 | A1 | 8/2015 | Deng et al. |
| 2015/0364832 | A1 | 12/2015 | Karlsson et al. |
| 2016/0104942 | A1 | 4/2016 | Pera et al. |
| 2017/0040679 | A1 | 2/2017 | FrÖhler et al. |
| 2017/0062952 | A1 | 3/2017 | Sundararajan et al. |
| 2019/0312337 | A1 | 10/2019 | Farzaneh et al. |
| 2020/0303836 | A1 | 9/2020 | Li et al. |
| 2020/0412011 | A1 | 12/2020 | Bisiules et al. |
| 2021/0075092 | A1 | 3/2021 | Su et al. |
| 2022/0166129 | A1 | 5/2022 | Tang et al. |
| 2022/0285858 | A1 | 9/2022 | Xiao et al. |
| 2023/0163483 | A1 | 5/2023 | Harel |
| 2023/0352811 | A1 | 11/2023 | Ponn et al. |
| 2024/0072421 | A1 | 2/2024 | Staita et al. |

OTHER PUBLICATIONS

International Search Report and the Written Opinion of the International Searching Authority corresponding to International Patent Application No. PCT/US2022/076152 (12 pages) (mailed Jan. 31, 2023).

Extended European Search Report corresponding to European Patent Application No. 22877464.2 (9 pages) (dated Jun. 12, 2025).

BASE STATION ANTENNA ARRANGEMENT, BASE STATION ANTENNA AND ANTENNA ASSEMBLY FOR BASE STATION ANTENNA

RELATED APPLICATIONS

This patent application is a continuation of U.S. patent application Ser. No. 17/929,403, filed Sep. 2, 2022, which claims the benefit of and priority to Chinese Patent Application Serial Number CN202111149349.8, filed Sep. 29, 2021, the contents of which are hereby incorporated by reference as if recited in full herein.

TECHNICAL FIELD

The present application generally relates to the field of radio communication technology, and more specifically, to an antenna assembly for base station antennas and a base station antenna arrangement as well as a base station antenna comprising such an antenna assembly.

BACKGROUND

Cellular communication systems are known in the art. In cellular communication systems, geographical areas may be divided into a series of cells and each cell may be served by the corresponding base station antenna arrangement.

With the development of 5G communication technology, base station antenna arrangements are becoming increasingly complex. Base station antenna arrangements may comprise a plurality of arrays of radiating elements that operate in different operating frequency bands. One known base station antenna arrangement comprises a passive antenna assembly and an active antenna assembly. It is desirable to use mature passive modules for passive antenna assemblies, as general passive modules are capable of adapting to a variety of active antenna assemblies and are cost-effective.

SUMMARY

The purpose of the present application is to provide an antenna assembly for base station antennas and a base station antenna arrangement comprising such an antenna assembly.

A first aspect of the present application relates to an antenna assembly for base station antennas, where the antenna assembly comprises a reflector, which has a longitudinal extent, a front side and a rear side opposite to the front side, where the front side is configured for radiating elements to be arranged thereon, in which, the reflector has a first longitudinal section residing in a first plane and a second longitudinal section residing in a second plane that is adjacent to the first longitudinal section, where the first plane is rearward of the second plane.

The properties of the base station antenna having the reflector may be improved through an innovative structure of the reflector of the antenna assembly.

In some embodiments, the first longitudinal section may be a longitudinal end section of the reflector.

In some embodiments, the first longitudinal section may be a longitudinal middle section of the reflector. The reflector may comprise two longitudinal end sections as the second longitudinal section. For example, the two second longitudinal sections may be in the same layer or in two different layers in the longitudinal extent of the reflector.

In some embodiments, the first longitudinal section may be transitioned to the second longitudinal section through a step segment.

In some embodiments, the first longitudinal section may be gently transitioned to the second longitudinal section, in which, the transition area may have a continuous curvature in the longitudinal extent.

In some embodiments, the first longitudinal section may have a window extending between laterally spaced apart first and second edge slats that reside on opposing longitudinally extending sides of the window.

In some embodiments, the window may extend only along a longitudinal extent the first longitudinal section.

In some embodiments, the window may extend on a part of the length of the first longitudinal section.

In some embodiments, the window may extend on a large part or the entire length of the length of the first longitudinal section.

In some embodiments, the window may be open on at least one longitudinal end of the first longitudinal section.

In some embodiments, the window may take up a large part, for example, more than ⅔ or more than ¾, of the width of the first longitudinal section.

In some embodiments, the window may be a rectangular window, in which, the edge slats may have straight inner edges.

In some embodiments, the antenna assembly may further comprise a radio frequency (RF) port and an array of radiating elements, wherein each of the radiating elements in the array are coupled to the RF port, and wherein some of the radiating elements in the array are mounted to extend forwardly from the first longitudinal section of the reflector, and other of the radiating elements in the array are mounted to extend forwardly from the second longitudinal section of the reflector.

In some embodiments, the window may extend laterally over at least a major portion of a width of the first longitudinal section.

In some embodiments, the antenna assembly may further comprise a first column of radiating elements that are mounted to extend forwardly from the first edge slat and a second column of radiating elements that are mounted to extend forwardly from the second edge slat.

In some embodiments, each edge slat may be configured for a column or a plurality or columns of radiating elements to be arranged on the front side of the edge slats.

In some embodiments, the antenna assembly may further comprise a dielectric layer extending across at least a portion of the window, in front of the first longitudinal section.

In some embodiments, at least one dielectric supporting element of the one or plurality of dielectric supporting elements may bridge the first and second edge slats of the first longitudinal section.

In some embodiments, in a projection facing the first longitudinal section, the dielectric layer may cover the window.

In some embodiments, the dielectric layer may extend parallel to the first longitudinal section.

In some embodiments, the dielectric layer may be a flat component or a curved component.

In some embodiments, the antenna assembly may comprise one or a plurality of dielectric supporting elements, for example distributed and set on the longitudinal extent of the first longitudinal section, where the supporting elements are fixed to at least one edge slat and supporting the dielectric layer.

In some embodiments, each supporting element may be a planar component bridging and fixed to the two edge slats of the first longitudinal section.

In some embodiments, the antenna assembly may comprise an array of radiating elements extending forward from the front side of the reflector.

In some embodiments, the radiating elements extending forward from the front side of the reflector may be passive radiating elements.

In some embodiments, the antenna assembly may have radiating elements of a unique type.

In some embodiments, the antenna assembly may have two or more types of radiating elements that are capable of working at different frequency bands.

In some embodiments, the radiating elements may be dual-polarized elements, for example, ±45 degrees polarized elements.

In some embodiments, the antenna assembly may further comprise a radio frequency (RF) port and an array of radiating elements, where each of the radiating elements in the array are coupled to the RF port, wherein a first subset of the radiating elements in the array are mounted to extend forwardly from the first longitudinal section of the reflector and a second subset of the radiating elements in the array are mounted to extend forwardly from the second longitudinal section of the reflector, and wherein a forwardmost end of at least some of the radiating elements in the first subset are rearward of forwardmost ends of the radiating elements in the second subset.

In some embodiments, the first longitudinal section may extend along less than half the longitudinal extent of the reflector.

In some embodiments, the reflector may have a third longitudinal section, wherein the third longitudinal section is co-planar with the second longitudinal section, and wherein the first longitudinal section resides between the second and third longitudinal sections.

In some embodiments, a first step segment may reside between the first and second longitudinal sections and a second step segment may reside between the first and third longitudinal segments.

In some embodiments, the antenna assembly may have exactly two longitudinal sections.

In some embodiments, the longitudinal extent of the first longitudinal section may take up a small part of the longitudinal extent of the reflector.

In some embodiments, the longitudinal extent of the first longitudinal section may take up less than 40%, for example approximately ⅓, of the longitudinal extent of the reflector.

In some embodiments, the antenna assembly may have three or more longitudinal sections, in which, every two adjacent longitudinal sections are staggered on the thickness direction of the reflector.

In some embodiments, the three or more longitudinal sections may be in two or more layers.

In some embodiments, every two adjacent longitudinal sections of the reflector may transition to each other through a step.

In some embodiments, each longitudinal section of the reflector may be configured for at least one radiating element to be arranged on the front side of the longitudinal section.

In some embodiments, the first and the second longitudinal sections of the reflector may extend parallel to each other.

In some embodiments, each longitudinal section of the reflector may basically extend in one plane.

In some embodiments, the step segment may comprise a bend in a metal substrate that forms both the first longitudinal section and the second longitudinal section.

A second aspect of the present application relates to a base station antenna arrangement, which comprises a base station antenna, where the base station antenna comprises a housing and an antenna assembly accommodated in the housing, which has a front side associated with the front side of the reflector and a rear side opposite to the front side, in which, the antenna assembly may be the antenna assembly for base station antennas according to the first aspect of the present application.

In some embodiments, the rear side of the housing may be flat.

In some embodiments, the rear side of the housing may have a central concave part extending on one part or the entire length of the longitudinal extent of the housing and rearwardly extending projections, one on each side of the central concave part across a width direction of the housing.

In some embodiments, the width of the central concave part may take up a large part, for example, more than ⅔rds or more than ¾rds, of the width of the housing. "A large part" herein may mean "more than half" and "a small part" may mean "less than half".

In some embodiments, the first longitudinal section of the reflector may comprise first and second edge slats that define a window therebetween, and the first and second edge slats are received in the rearwardly extending projections in the housing.

In some embodiments, the housing may have a rectangular or elliptical cross section.

In some embodiments, the first longitudinal section of the reflector may comprise first and second edge slats that define a window therebetween, and the first and second edge slats are received in the rearwardly extending projections in the housing.

In some embodiments, the base station antenna arrangement may comprise an active antenna module, which may be mounted on the rear side of the housing of the base station antenna behind the first longitudinal section of the reflector.

In some embodiments, the active antenna module may comprise an active reflector and an array of active radiating elements extending forwardly from the active reflector.

In some embodiments, the first longitudinal section of the reflector of the antenna assembly may have a window, and the active radiating elements of the active antenna module extend at least partially through the window.

In some embodiments, the first longitudinal section of the reflector of the antenna assembly may have a window and edge slats that limit the window from two sides on the width direction of the first longitudinal section, and the window may be located in front of the array of active radiating elements.

In some embodiments, in a projection facing the first longitudinal section, the array of active radiating elements may be located inside the window.

In some embodiments, the active reflector of the active antenna module may be capacitively and/or galvanically coupled to the first longitudinal section of the reflector of the antenna assembly, such that the active reflector of the active antenna module and the reflector of the antenna assembly have a common electrical ground/potential.

In some embodiments, the active antenna module may comprise a radio circuitry, an active reflector, and a mMIMO antenna array projecting forwardly from the active reflector.

An aspect of the present invention relates to a base station antenna arrangement comprising:

a base station antenna comprising a passive reflector having a first longitudinal section residing in a first plane and a second longitudinal section residing in a second plane, wherein the first plane is offset from the second plane in a rearward direction, wherein the offset is a distance in a range of 0.25 inches and 5 inches; and an active antenna module comprising an active reflector coupled to the base station antenna behind the first longitudinal section of the passive reflector.

In some embodiments, the active reflector may be electrically coupled to the passive reflector through at least one radome.

In some embodiments, the at least one radome may comprise a radome of the base station antenna that faces the active antenna module and a radome of the active antenna module that faces the radome of the base station antenna.

In some embodiments, the electrical coupling may be a capacitive coupling and/or a galvanic coupling.

In some embodiments, the first and second longitudinal sections may be joined by a stepped segment.

In some embodiments, the stepped segment may be defined by at least one bend in the reflector providing one or both of the first longitudinal section and the second longitudinal section.

In some embodiments, the stepped segment may be provided by a discrete interface member extending in a front to back direction and attached to the first and second longitudinal sections.

In some embodiments, the stepped segment may be perpendicular to the first and second longitudinal sections.

In some embodiments, the base station antenna may further comprise a dielectric material residing across and in front of at least part of the first longitudinal section.

In some embodiments, the base station antenna may further comprise a first column of radiating elements mounted to extend forwardly from a first side of the first longitudinal section and a second column of radiating elements mounted to extend forwardly from the second side of the first longitudinal section, wherein a medial segment of the first longitudinal section is free of radiating elements, and wherein the active antenna module comprises an array of radiating elements that project forwardly behind the medial segment of the first longitudinal section or that extend forwardly into a window in the medial segment of the first longitudinal section.

In some embodiments, an aspect of the present invention relates to a base station antenna, that includes: a first radio frequency (RF) port; a passive reflector having a first longitudinal section residing in a first plane and a second longitudinal section residing in a second plane, where the first plane is offset from the second plane in a rearward direction, and where the offset is a distance in a range of 0.25 inches and 5 inches; and an antenna assembly configured with a first array of radiating elements that are all coupled to the first RF port. A first subset of the radiating elements in the first array are mounted on the first longitudinal section and a second subset of the radiating elements in the first array are mounted on the second longitudinal section.

In some embodiments, the base station antenna may further include a second RF port and the antenna assembly can further include a second array of radiating elements that are all coupled to the second RF port. A first subset of the radiating elements in the second array are mounted on the first longitudinal section and a second subset of the radiating elements in the second array are mounted on the second longitudinal section. The first subsets of the radiating elements in the respective first and second arrays have laterally spaced apart first and second columns of radiating elements on right and left side portions of the first longitudinal section, projecting in a forward direction, and the second subsets of the radiating elements in the respective first and second arrays have laterally spaced apart first and second columns of radiating elements on the second longitudinal section, projecting in the forward direction.

In some embodiments, the first and second arrays of radiating elements may be configured to operate in all or part of the 617-960 MHz frequency band.

In some embodiments, the antenna assembly may further comprise a plurality of radiating elements extending only along the second longitudinal section that are configured to operate in all or part of the 1427-2690 MHz frequency band.

In some embodiments, a major portion of a width dimension of the first longitudinal section may be free of radiating elements.

In some embodiments, the first longitudinal section may comprise a window that extends laterally between right and left side portions of the first longitudinal section and longitudinally along at least a major portion of a length extent of the first longitudinal section, and wherein the right and left side portions comprise radiating elements projecting forward therefrom.

Another aspect of the present invention relates to a base station antenna that includes: a first radio frequency (RF) port; a passive reflector having a first longitudinal section residing in a first plane and a second longitudinal section residing in a second plane. The first plane is offset from the second plane in a rearward direction. The base station antenna also includes a first array of radiating elements that are coupled to the first RF port, where at least some of the radiating elements in the first array are mounted to extend forwardly from the first longitudinal section of the reflector; and an active antenna module that includes an active reflector and an array of active radiating elements extending forwardly from the active reflector. The active reflector is substantially coplanar with the first longitudinal section of the passive reflector.

In some embodiments, others of the radiating elements in the first array may be mounted to extend forwardly from the second longitudinal section of the passive reflector.

In some embodiments, the active antenna module may be mounted behind the first longitudinal section of the passive reflector.

In some embodiments, the active reflector may be electrically coupled to the passive reflector.

In some embodiments, the active reflector may be coupled to the passive reflector through a frame that is used to mount the active antenna module to the base station antenna.

In some embodiments, the first longitudinal section of the passive reflector may include a window, and wherein the active radiating elements extend forwardly from the active reflector to pass at least partially through the window.

The above-mentioned technical features, the technical features to be mentioned below and the technical features shown separately in the drawings can be arbitrarily combined with each other as long as the combined technical features are not contradictory. All feasible feature combinations are technical contents clearly included herein.

BRIEF DESCRIPTION OF THE DRAWINGS

Now, exemplary embodiments of the present disclosure are described with reference to the schematic drawings.

DETAILED DESCRIPTION

Figure 1:
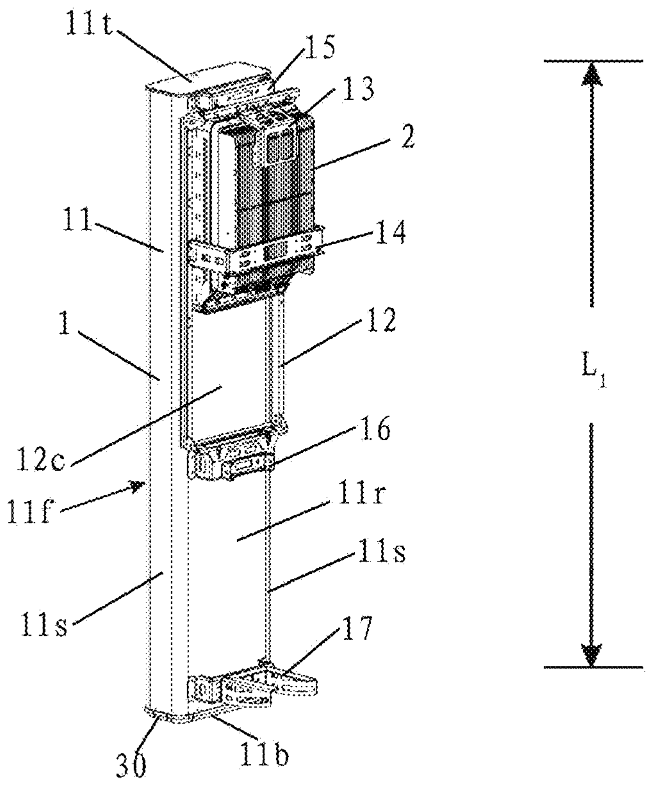
FIG. 1 is a rear perspective view of a base station antenna arrangement according to embodiments of the present invention.
Figure 2:
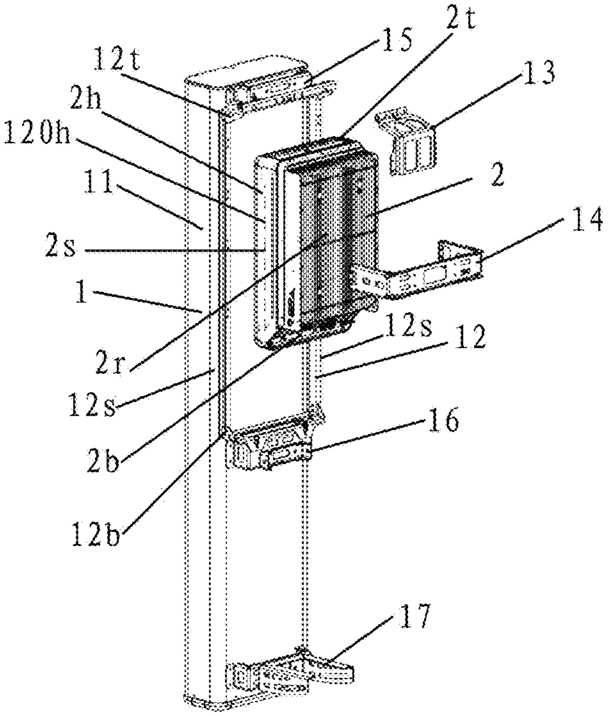
FIG. 2 is an exploded, rear perspective view of the base station antenna arrangement of FIG. 1.
Figure 3:
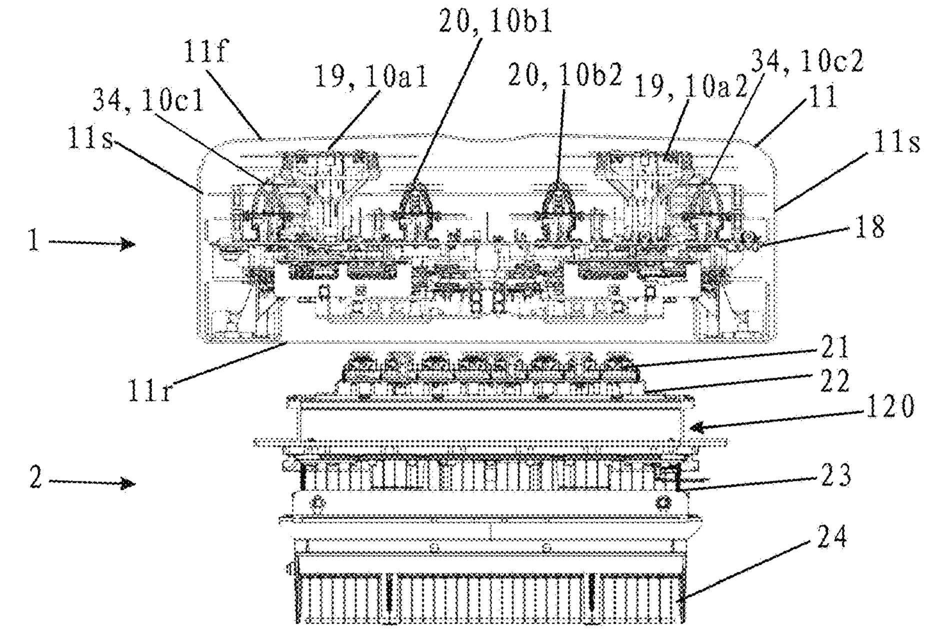
FIG. 3 is a lateral cross-sectional view of the base station antenna arrangement of FIG. 1.

Referring to FIGS. 1-3, a base station antenna arrangement is shown that includes a base station antenna 1 and an active antenna module 2 attached to the base station antenna 1. The base station antenna 1 has a housing 11. The housing 11 may be substantially rectangular with a flat rectangular cross-section. The housing 11 may have a front side 11*f* and a rear side 11*r* opposite the front side 11*f*, two (narrow) sidewalls 11*s* facing each other and extending between the front side 11*f* and the rear side 11*r*, a top side 11*t* and a bottom side 11*b* opposite the top side 11*t*. Typically, the top side 11*t* of the housing 11 may be sealed in a waterproof manner and may comprise an end cap and the bottom side 11*b* of the housing 11 may be sealed with a separate end cap 30. The front side 11*f*, the sidewalls 11*s* and possibly the rear side 11*r* of the housing 11 may comprise a radome that is substantially transparent to radio frequency (RF) energy within the operating frequency bands of the base station antenna 1. The radome may be formed of, for example, fiberglass or plastic. An antenna assembly 10 of base station antenna 1 (shown in FIG. 4) may be slidably inserted, optionally pushed from the bottom side 11*b* of the housing 11, into the housing 11. However, other assembly methods may be used, such as inserting the antenna assembly 10 from the top side 11*t* of the housing 11.

The active antenna module 2 may be attached to the base station antenna 1 at the rear side 11*r* of the housing 11 of the base station antenna 1. The rear side 11*r* of the housing 11 may be a flat surface extending along a common plane over an entire longitudinal extent thereof or along at least a portion of the longitudinal extent thereof. The rear surface 11*r* can comprise a plurality of longitudinally spaced apart mounting structure brackets, shown as upper, medial, and lower brackets, 15, 16, 17, respectively, that extend rearwardly from the housing 11. In some embodiments, the mounting structure brackets 15, 16, 17 may be configured to couple to one or more mounting structures such as, for example, a tower, pole or building (not shown). At least two of the mounting structure brackets 15, 16 can also be configured to attach to a frame 12 of the base station antenna arrangement. The frame 12 may extend over a sub-length of a longitudinal extent $L_1$ of base station antenna 1, where the sub-length is shown in FIG. 1 as being at least a major portion thereof. The frame 12 can comprise a top 12*t*, a bottom 12*b* and two opposing long sides 12*s* that extend between the top 12*t* and the bottom 12*b*. The frame 12 can have an open center space 12*c* extending laterally between the long sides 12*s* and longitudinally between the top 12*t* and bottom 12*b*.

The active antenna module 2 can be configured to attach to the frame 12 using a plurality of accessory brackets, shown as a first accessory bracket 13 and a second accessory bracket 14. The first accessory bracket 13 can attach to a top portion 2*t* of the active antenna module 2 and to a rear 2*r* of the active antenna module 2. The second accessory bracket 14 can span laterally below the first accessory bracket 13 and may be fixed to the opposing two sides 12*s* of the frame 12. Thus, the frame 12 can attach the active antenna module 2 to the base station antenna 1.

The frame 12 may be configured so that a variety of different active antenna modules 2 can be mounted to the frame 12 using appropriate accessory brackets 13, 14. As such, a variety of active antenna modules 2 may be interchangeably attached to the same base station antenna 1.

The different active antenna modules 2 may attach to the same configuration of the frame 12 or a different configuration of the frame 12 using the same accessory brackets 13, 14 or using a plurality of the second accessory brackets 14 without requiring the first accessory (top) bracket 13. Other configurations of accessory brackets 14 may be used. The different active antenna modules 2 that may be attached to the frame 12 may have different dimensions, for example, different lengths and/or different widths and/or different thicknesses.

In some embodiments, a plurality of active antenna modules 2 may be concurrently attached to the same base station antenna 1 at different longitudinal locations using one or more frames 12. Such active antenna modules 2 may have different dimensions, for example, different lengths and/or different widths and/or different thicknesses.

The term "active antenna module" is used interchangeably with "active antenna unit" and "AAU" and refers to a cellular communications unit comprising radio circuitry and associated radiating elements. The radio circuitry is capable of electronically adjusting the amplitude and/or phase of the subcomponents of an RF signal that are output to different radiating elements of an array or groups thereof. The active antenna module 2 comprises the radio circuitry and the radiating elements (e.g., a massive multi-input-multi-output (mMIMO) beamforming antenna array) and may include other components such as filters, a calibration network, an antenna interface signal group (AISG) controller and the like. The active antenna module 2 can be provided as a single integrated unit or provided as a plurality of stackable units, including, for example, first and second sub-units such as a radio sub-unit (box) with the radio circuitry and an antenna sub-unit (box) with a multi-column array of radiating elements and the first and second sub-units stackably attach together in a front to back direction of the base station antenna 1, with the antenna unit 120 (FIG. 3) closer to the front 11*f* of the housing 11 of base station antenna 1 than the radio circuitry unit 23. In some embodiments, the radiating elements may comprise a separate sub-unit from the radio circuitry and the radiating element sub-unit may be mounted within the base station antenna 1 instead of being external to the base station antenna 1.

As will be discussed further below, the base station antenna 1 includes an antenna assembly 10, which can be referred to as a "passive antenna assembly". The term "passive antenna assembly" refers to an antenna assembly having arrays of radiating elements that are coupled to radios that are external to the antenna, typically remote radio heads that are mounted in close proximity to the base station antenna 1. The arrays of radiating elements included in the passive antenna assembly are configured to form static antenna beams (e.g., antenna beams that are each configured to cover a sector of a base station). The passive antenna assembly can comprise radiating elements such as one or more linear arrays of low band radiating elements that operate in all or part of the 617-960 MHz frequency band and/or one or more linear arrays of mid-band radiating elements that operate in all or part of the 1427-2690 MHz frequency band. The passive antenna assembly 10 is mounted in the housing 11 of base station antenna 1 and one or more active antenna modules 2 can releasably (detachably) couple (e.g., directly or indirectly attach) to base station antenna 1 via the frame 12.

Figure 4:
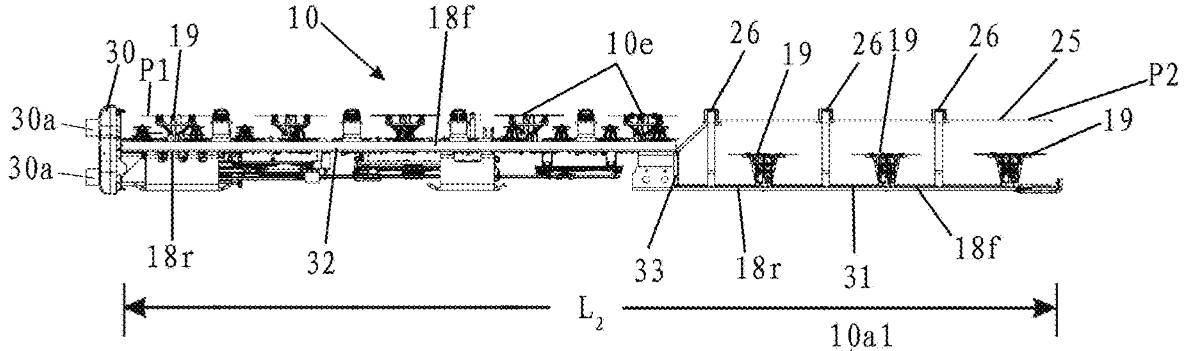
FIG. 4 is a side view of an antenna assembly of the base station antenna arrangement of FIG. 1.
Figure 5:
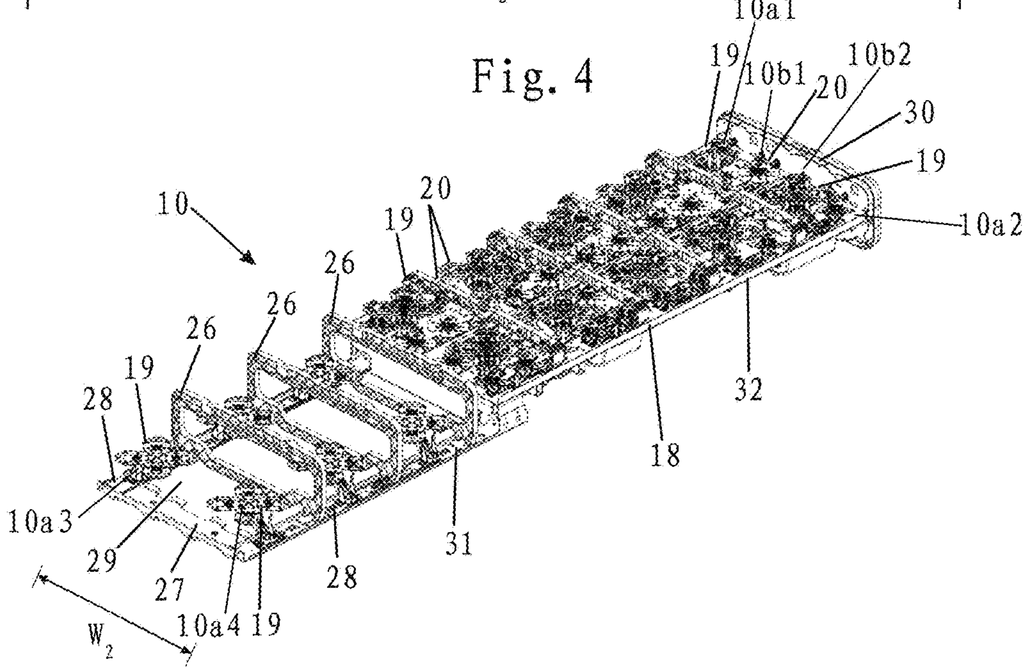
FIG. 5 and FIG. 6 are two different perspective views of the base station antenna assembly of FIG. 4.
Figure 6:
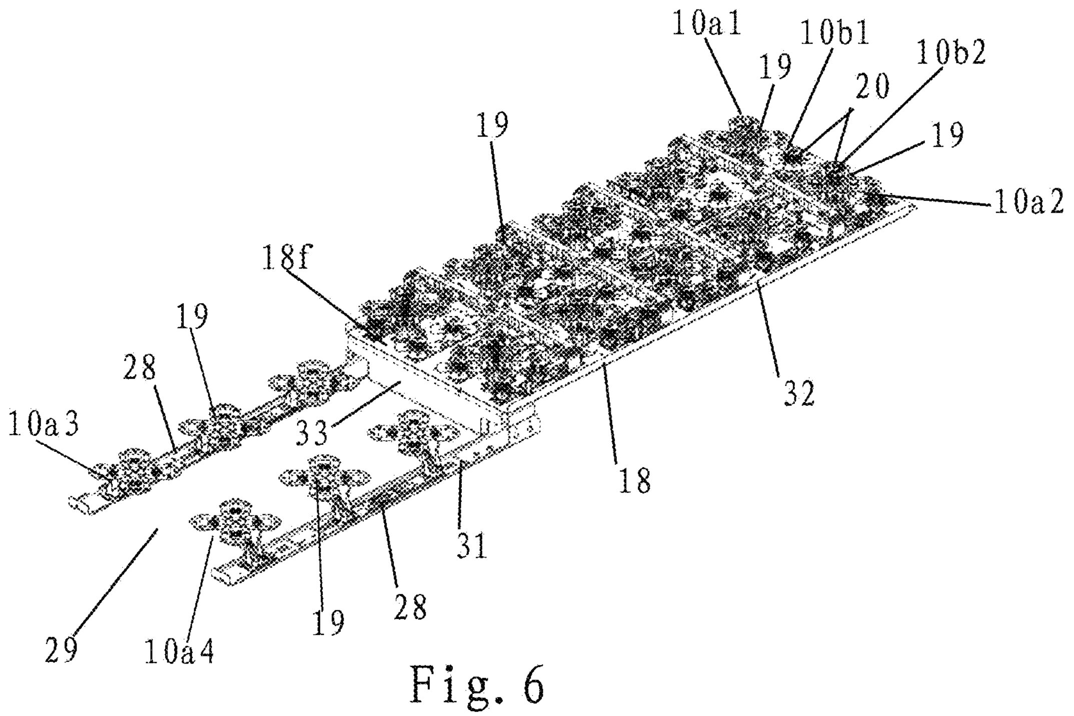

FIG. 4 is a side view of an example antenna assembly 10 provided inside the base station antenna 1. FIG. 5 is a perspective view of the antenna assembly 10, in which a dielectric material component 25 that is shown in FIG. 4 is removed. FIG. 6 is another perspective view of the antenna assembly 10, in which components 25, 26, and 27 and end cover 30 shown in FIG. 4 and FIG. 5 are removed to more clearly show an example reflector 18 of the antenna assembly 10.

The reflector 18 has a longitudinal extent $L_2$ and a lateral extent $W_2$. The reflector 18 has a front side 18*f* and rear side 18*r* opposite the front side 18*f*. The front side 18*f* of the reflector 18 faces the front side 11*f* of the housing 11 and the rear side 18*r* of the reflector 18 faces the rear side 11*r* of the housing 11. The antenna assembly 10 comprises multiple arrays of radiating elements 10*a*1, 10*a*2, 10*b*1, 10*b*2, 10*c*1, 10*c*2 that extend forwardly from the front side 18*f* of the reflector 18. The arrays of radiating elements 10*a*1, 10*a*2, of the antenna assembly 10 may comprise radiating elements 19 that are configured to operate in a first frequency band. The arrays of radiating elements 10*b*1, 10*b*2 of the antenna assembly 10 may comprise radiating elements 20 that are configured to operate in a second frequency band. The arrays of radiating elements 10*c*1, 10*c*2, of the antenna assembly 10 may comprise radiating elements 34 that are configured to operate in either the second frequency band or in a third frequency band. The first, second and third frequency bands may be different frequency bands (although potentially overlapping).

Referring to FIGS. 4-6, the reflector 18 may have a first longitudinal section 31 and a second longitudinal section 32 that is adjacent the first longitudinal section 31, where the first longitudinal section 31 is longitudinally spaced apart from the second longitudinal section 32 and the second longitudinal section 32 is in a plane that is forwardly offset from a plane of the first longitudinal section 31. The first longitudinal section 31 may be a longitudinal end section of the reflector 18, shown as a top end section but it is contemplated that the first longitudinal section 31 may be provided as a medial or bottom end section in other embodiments. The offset, measured in a front-to-back direction in an installed orientation, may, for example, be in a range of 0.25 inches to 5 inches, more typically 0.5 inches to 3 inches.

Figure 11A:
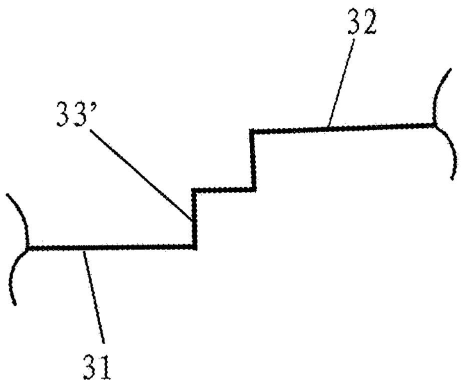
FIGS. 11A-11C and 12 are schematic illustrations of additional embodiments of stepped segments that may be used to join first and second longitudinal sections of a reflector according to embodiments of the present invention.
Figure 11B:
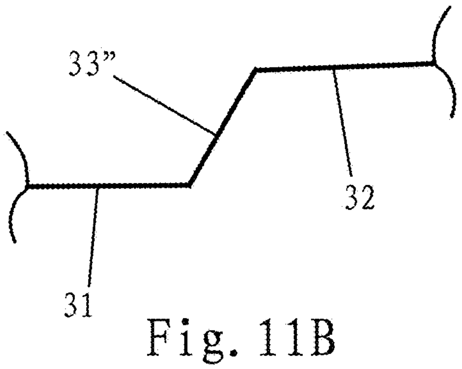

The first longitudinal section 31 may take up a sub-length of, for example, about 20-40%, such as about 30%, in some embodiments, of the longitudinal extent $L_2$ of the reflector 18. It will be appreciated, however, that with shorter antennas the first longitudinal section 31 may take up a sub-length of more than 50% of the longitudinal extent $L_2$ of the reflector 18. As shown in FIG. 4 to FIG. 6, the first longitudinal section 31 can transition to the second longitudinal section 32 through a step or step segment 33. The step segment 33 can be (but need not necessarily be) perpendicular to the first and second longitudinal sections 31, 32. FIGS. 11A, 11B, show other configurations of the step segment 33', 33" according to further embodiments of the present invention.

Figure 11C:
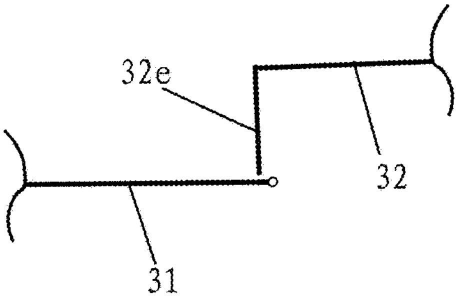
Figure 12:
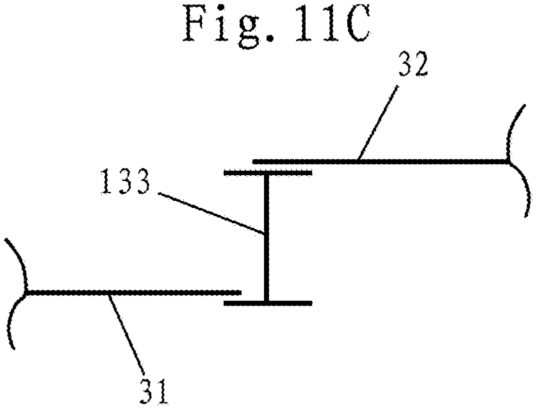

The first and second longitudinal sections 31, 32 and the step segment 33 can be monolithically formed as a unitary metal body in some embodiments. In other words, the first longitudinal section 31, the second longitudinal section 32 and the step segment 33 may all comprise a single piece of metal. The step segment 33 can be provided as a bent segment of the reflector 18. Alternatively, the first and second longitudinal sections 31, 32 can be separate components and the step segment 33 can be provided by a separate component such as an interface member 133 (FIG. 12) that is attached to the first and second longitudinal sections 31, 32 and/or that is capacitively coupled to the first and second longitudinal sections 31, 32. In yet other embodiments, the step segment 33 can be a shaped extension 32*e* of one of the longitudinal components 31, 32 as shown in FIG. 11C so that the first longitudinal section 31, the second longitudinal section 32 and the step segment 33 are formed from two pieces of metal. The step segment 33' can comprise a plurality of steps (FIG. 11A) and/or an angled segment 33" (FIG. 11B) that is at an angle of, for example, 30-70 degrees with respect to the planes defied by the first and second longitudinal sections 31, 32. Each longitudinal section 31, 32 may substantially extend in different planes. The first and second longitudinal sections 31, 32 can be substantially parallel to each other and reside a distance apart in a range of 0.5 inches to 2 inches, in some embodiments, and 0.5 inches to 3 inches or 0.5 inches to 5 inches in other embodiments. The term "substantially parallel" means that the primary planes of each longitudinal section 31, 32 are within +/−10 degrees of each other over the respective longitudinal extents thereof.

The first longitudinal section 31 may have two laterally spaced apart and longitudinally extending edge slats 28 that may define a window 29 therebetween. The window 29 may extend a sub-length of or the entire length of the longitudinal extent of the first longitudinal section 31. The window 29 may be enclosed on all sides or may be open on at least one side.

Referring to FIGS. 3 to 6, on the second longitudinal section 32, the antenna assembly 10 may comprise two columns of first radiating elements 19 with a lower working frequency, two columns of second radiating elements 20 with a higher working frequency than the first radiating elements 19, and two columns of third radiating elements 34 with a higher working frequency than the first radiating elements 19. The second radiating elements 20 and the third radiating elements 34 may be configured to operate in the same or different operating frequency bands. In the width direction of the second longitudinal section 32, the columns of second radiating elements 20 may be positioned between the columns of first radiating elements 19. The columns of first radiating elements 19 and second radiating elements 20 may be positioned between the two columns of third radiating elements 34.

First and second columns of first radiating elements 19 may also be respectively arranged on the two edge slats 28 on the first longitudinal section 31. The first column of first radiating elements 19 on the second longitudinal section 32 and the first column of first radiating elements 19 on the first longitudinal section 31 may together form a first linear array of first radiating elements that are all coupled to a common RF port of base station antenna 1 (or to two common RF ports if the first radiating elements 19 are dual polarized radiating elements). The second column of first radiating elements 19 on the second longitudinal section 32 and the second column of first radiating elements 19 on the first longitudinal section 31 may together form a second linear array of first radiating elements 19 that are all coupled to another common RF port of base station antenna 1 (or to two other common RF ports if the first radiating elements 19 are dual polarized radiating elements). The two columns of second radiating elements 20 may likewise form two additional linear arrays, and the two columns of third radiating elements 34 may form another two linear arrays. An upper and a lower column of RF ports 30*a* on the end cap 30 are shown exemplarily in FIG. 4. The various radiating elements of the (passive) antenna assembly 10 may be referred to as passive radiating elements, and the linear arrays that these radiating elements form may be referred to as passive linear arrays.

The first radiating elements 19 that are mounted on the first longitudinal section 31 of the stepped reflector 18 are mounted farther rearwardly than the first radiating elements 19 that are mounted on the second longitudinal section 32 of the stepped reflector 18. To ensure that the antenna beams generated by the arrays 10*a*1, 10*a*2 that include the first radiating elements 19, phase compensation may be applied to the first radiating elements 19 that are mounted on the first longitudinal section 31 with respect to the first radiating elements 19 that are mounted on the second longitudinal section 32 so that the RF energy emitted by these first radiating elements will constructively combine to form a desired wavefront.

In the embodiment of FIGS. 1-6, only the first radiating elements 19 extend onto the first longitudinal section 31 of the reflector 18. It will be appreciated, however, that embodiments of the present invention are not limited thereto. For example, in other embodiments, the arrays 10*c*1, 10*c*2 of the third radiating elements 34 may be lengthened by including additional radiating elements 34 in each array 10*c*1, 10*c*2, where the additional radiating elements 34 are mounted on the respective first and second edge slats 28 of the first longitudinal section 31 of the reflector 18. Thus, it will be appreciated that first radiating elements 19 and/or third radiating elements 34 may be mounted on each edge slat 28 of the first longitudinal section 31 of the reflector 18, and that the arrays 10*c*1, 10*c*2 may also or alternatively span both the first and second longitudinal sections 31, 32 of the reflector 18. In other embodiments, the radiating elements mounted on the first longitudinal section 31 could comprise separate arrays so that the antenna included vertically stacked arrays. For example, the depicted embodiment of FIGS. 1-6 could be modified so that the two columns of first radiating elements 19 that are mounted on the second longitudinal section 32 of the reflector 18 could be coupled to respective RF first and second ports to form first and second arrays 10*a*1, 10*a*2 of first radiating elements 19, and the two columns of first radiating elements 19 that are mounted on the first longitudinal section 31 of the reflector 18 could be coupled to respective third and fourth RF ports to form third and fourth arrays 10*a*3, 10*a*4 of first radiating elements 19.

As shown in FIG. 5, the first longitudinal section 31 of the reflector 18 may optionally include a connecting strip 27 on the end part so that the window 29 may be fully enclosed. The connecting strip 27 may connect the two edge slats 28 of the first longitudinal section 31 of the reflector 18 such that the first longitudinal section 31 is more stable. The connecting strip 27 may be made of dielectric material(s) in some embodiments. A planar dielectric layer 25 may be set in front of at least part of the first longitudinal section 31. For this option, the antenna assembly 10 may comprise a plurality of supporting elements 26 that are longitudinally spaced apart and coupled to the first longitudinal section 31. The supporting elements 26 may be planar components bridging and fixed to the two edge slats 28 of the first longitudinal section 31 and may be used to mount the dielectric layer 25 forwardly of the window 29. The planar dielectric layer 25 may comprise a matching layer that is configured to reduce return loss and/or passive intermodulation distortion, for example.

In the cross-section shown in FIG. 3, the housing 2*h* of the active antenna module 2 is removed to show the internal structure of an example active antenna module 2. More specifically, the active antenna module 2 may comprise two sub-units, that is, an antenna unit 120 at the front side and radio circuitry 23 at the rear side. These two units 120, 23 may have respective housings and may be mechanically and electrically connected to each other. The housing 120*h* of the antenna unit 120 may include a radome. The radio circuitry 23 may be equipped with a cooling device 24. The cooling device may have a metal fin structure and/or may be a controlled fan. The active antenna module 2 may also be provided as an integrated unit with a single housing 2*h* and without requiring the radio circuitry 23 to be a separate stacked unit. Rather, the radio circuitry 23 can be integrated inside a single housing/radome.

The active antenna module 2 may comprise a reflector 22 and an array of active radiating elements 21 extending forwardly from the reflector 22. The reflector 22 may be provided, for example, as a sheet metal reflector or as a metal ground plane of a printed circuit board. The reflector 22 of the active antenna module 2 may be referred to herein as an "active reflector" and the reflector 18 of the base station antenna 1 may be referred to herein as a "passive reflector" for ease of discussion.

The active antenna module 2, for example, may be configured for 5G communication services. The radiating elements 21 of the active antenna module 2 may have a higher working frequency than the (passive) radiating elements 19, 20 and 34 of the base station antenna 1. The radiating elements 21 may work at a high frequency band, for example, at a frequency band of 3,300-4,200 MHz. The radiating elements 21 can be provided as a massive MIMO (mMIMO) array of radiating elements in some embodiments.

The active reflector 22 can cooperate with the passive reflector 18 and the two can be configured to functionally act as a single reflector that resides behind various of the radiating elements. For example, some of the lower-band radiating elements 19 project forwardly from the first longitudinal section 31 of the passive reflector 18 and also laterally extend in front of and over an adjacent segment of the active reflector 22. The two reflectors 18, 21 may thus act as single reflector for the lower-band radiating elements 19 that laterally extend in front of and over the active reflector 22. At the same time, the passive reflector 18 does not impede the performance of the active radiating elements 21 of the active antenna module 2. For example, the active reflector 22 may be configured to be substantially coplanar with the first longitudinal section 31 of the passive reflector 18. As such, the first longitudinal section 31 of the passive reflector 18 may not substantially block RF energy emitted by the active radiating elements. Herein, the active reflector 22 is considered to be "substantially coplanar" with the first longitudinal section 31 of the passive reflector 18 if a plane defined by the active reflector is positioned within 0.5 inches either forwardly or rearwardly of a plane defined by the first longitudinal section 31 of the passive reflector 18.

In conventional base station antennas, the internal reflectors have respective longitudinal extents that extend in a straight line (viewed from the side), e.g., the reflectors extend is in a single plane over their longitudinal extents. In the exemplary embodiments according to the present invention, the passive reflector 18 may be curvilinear, when viewed from the side (FIGS. 4-6), in the longitudinal direction, in which, the passive reflector 18 of the base station antenna 1 can reside sufficiently close to the active reflector 22 of the active antenna module 2 in the first longitudinal section 31 such that the two reflectors 18 and 22 may be electrically coupled through, for example, a radome of the base station antenna 1 and the active antenna module 2 and the two reflectors 18 and 22 can therefore have a common electrical ground or electrical potential. The passive reflector 18 and the active reflector 22 can be capacitively coupled and/or galvanically coupled to each other to provide this common ground potential. An electrical ground path can extend between the active reflector 22 and the passive reflector 18 via various internal and external components to provide the common electrical ground reference.

The passive reflector 18 can be capacitively and/or galvanically coupled to the active reflector 22 at one or more locations. For example, in some embodiments, the passive reflector 18 can be capacitively coupled to the active reflector 22 through a radome of the active antenna module 2 and/or through a radome that is part of the housing 11 of the base station antenna 1. More specifically, the electrical coupling can be through the rear side 11*r* of the housing 11 of the base station antenna 1 and through the front 2*f* of the radome of the active antenna module 2, and/or through the sidewalls 11*s* of the housing 11 and the side 2*s* of the active antenna module 2, and/or through a top and bottom 2*t*, 2*b* of the active antenna module 2 and frame 12 through housing 11. In one specific embodiment, the frame 12 may be configured to galvanically or capacitively couple to the first longitudinal section 31 of the passive reflector 18. The frame 12 may also be configured to galvanically or capacitively couple to a housing of the active antenna module, and the housing of the active antenna module 2 may be galvanically or capacitively coupled to the active reflector 22. Thus, the frame 12 may be located along an electrical path that provides a common ground reference between the passive reflector 18 and the active reflector 22. As noted above, the rear side 11*r* and sidewalls 11*s* of housing 11 may comprise portions of the radome of the base station antenna 1. Through the configuration of the reflector 18, a combined base station antenna arrangement comprising a general passive module defined by the base station antenna 1 and a variety of active antenna modules 2 may be provided, in which, the various reflectors of each can have a common earth (ground) potential.

The window 29 of the first longitudinal section 31 of the reflector 18 of the antenna assembly 10 is located in front of the radio circuitry of the active antenna module 2. In some embodiments, the active radiating elements 21 may be located rearwardly of the window 29. This may advantageously allow the rear side 11*r* of the housing 11 to be flat. It will be appreciated, however, that in other embodiments the base station antenna arrangement may be configured so that the active radiating elements 21 may extend forwardly at least partially through the window 29. The window 29 can have a lateral and longitudinal extent with a perimeter that corresponds to a perimeter of the array of radiating elements 21. The window 29 can have a lateral extent that is greater than a sum of the lateral extents of each edge slat 28.

In some embodiments, referring to FIG. 4, a dielectric layer 25 can be positioned in front of the first longitudinal section 31 of the antenna assembly 10 to provide a compensating effect to the active antenna module 2 for the front radome of housing 11. The dielectric layer 25 may be a flat component or curved or otherwise shaped component. The dielectric layer 25 may partially or completely cover the window 29, for example, it may partially or completely cover the window 29 along a length thereof and laterally across the entire first longitudinal section 31 and may reside in front of at least some of the radiating elements 19 and/or 21.

Referring to FIG. 4, the dielectric layer 25 may reside in front of the radiating elements 19 that are mounted on the first longitudinal section 31 in a plane $P_2$ that is substantially aligned with (+/−0.25 inches) a plane $P_1$ extending along the second longitudinal section 32 of the reflector 18 with plane $P_1$ defined by forwardmost ends 10*e* of radiating elements 19 that project forwardly from the second longitudinal section 32 (FIG. 4).

Figure 7:
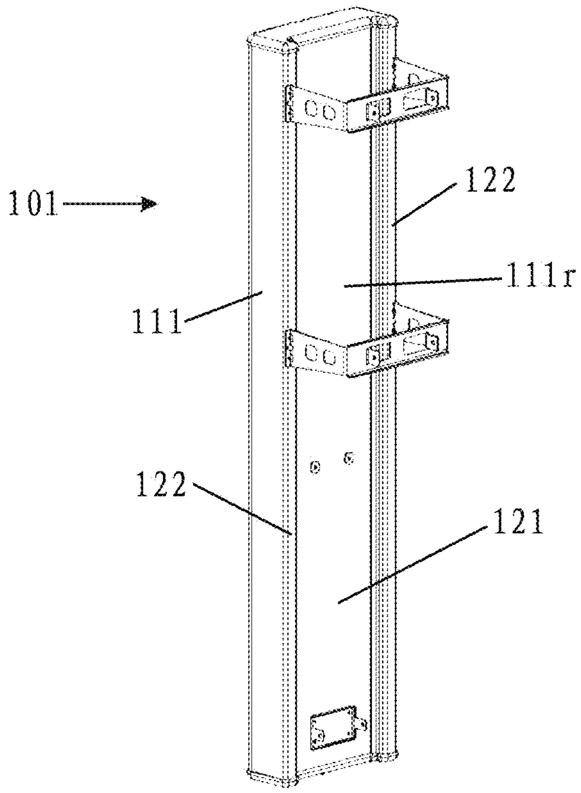
FIG. 7 is a rear perspective view of a housing of a base station antenna arrangement according to embodiments of the present disclosure.
Figure 8:
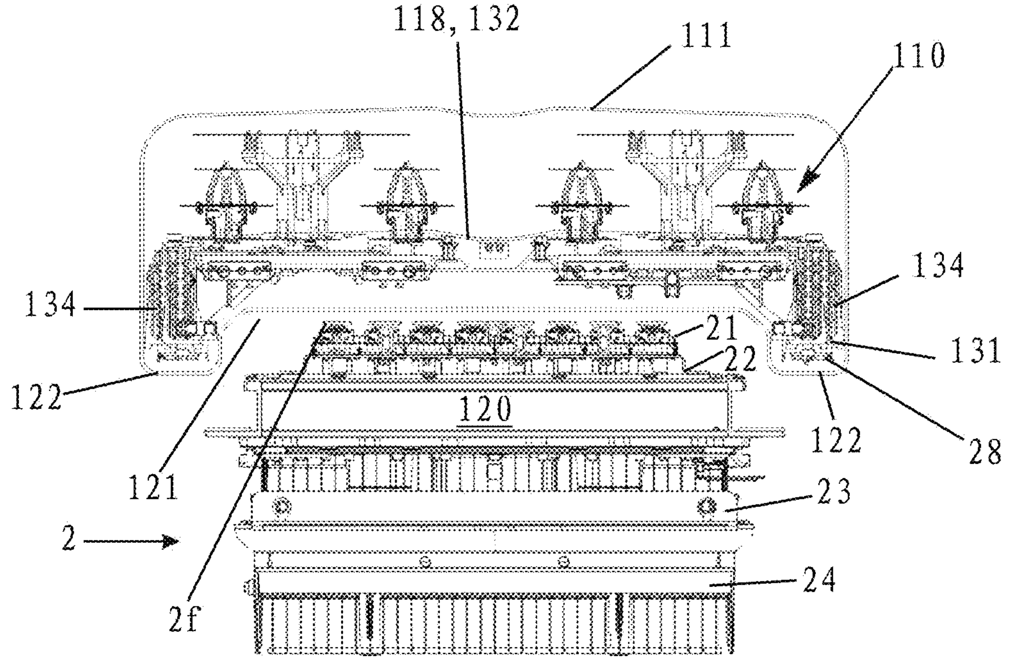
FIG. 8 is a lateral cross-sectional view of a base station antenna arrangement that includes the housing of FIG. 7.

The dielectric layer 25 may be provided by a multiple layer printed circuit board or a flex circuit or other dielectric material or substrate. Referring to FIGS. 7 and 8, a base station antenna 101 with a housing 111 according to further embodiments of the present invention is shown. The housing 111 may comprise or include a radome. The active antenna module 2 of the base station antenna arrangement according to this embodiment may have the same configuration as the base station antenna 1 that is discussed above, and thus the relevant illustrations and descriptions may be referenced. The active antenna module 2 is omitted from FIG. 7 to more clearly show the rear side 111*r* of the housing 111 of the base station antenna 101.

In the base station antenna 101, the antenna assembly 110 (FIG. 8) may have a similar configuration as the antenna assembly 10 of the base station antenna 1 that is discussed above, and the reflector 118 of the antenna assembly 110 may have the same or a similar configuration to the reflector 18 of base station antenna 1.

The rear side 111*r* of the housing 111 may have a central recessed or concave segment 121 that extends over a sub-length or the entire length of the longitudinal extent of the housing 111 and rearwardly projecting segments 122 can extend on each side of the central segment 121 that limit the central concave part 121 from two sides across the width direction of the housing 111. In some embodiments, the central recessed segment 121 of the housing 111 may comprise a portion of a radome of the housing 111.

Referring to FIG. 8, the passive reflector 118 can have the same or a similar configuration as the passive reflector 18 shown in FIG. 4 to FIG. 6. The passive reflector 118 may be placed in the housing space of the longitudinal extent limited by the rearwardly projecting segments 122 of the housing 111 through the first longitudinal section 131 thereof, and the reflector 118 may be placed on or adjacent the inner surface of the central concave part 122 of the housing 111 through the second longitudinal section 132 thereof. The second longitudinal section 132 may be arranged with an array of first radiating elements 119, an array of second radiating elements 120 and an array of third radiating elements 134 (configured same or similar to the radiating elements 19, 20, 34) that work at two or more different frequency bands, and the first longitudinal section 131 may be arranged with additional columns of first radiating elements 119 (corresponding to the first radiating elements 19, FIG. 5) on the respective edge slats 28 thereof that are part of the arrays of first radiating elements 119 that are mounted on the second longitudinal section 132. Due to the concave design of the rear side of the housing 111, the antenna assembly 110 may not have supporting elements 26 that are present in the base station antenna 1 according to the first embodiment. As shown in FIG. 8, a front **2*f* of the active antenna module 2 can be configured to reside in the central concave segment 122**.

Figure 9A:
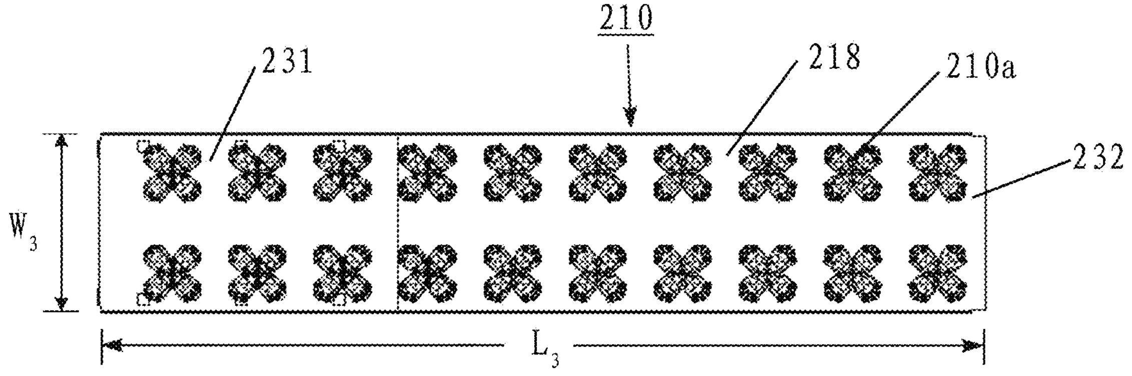
FIGS. 9A and 9B are a top view and a side view, respectively, of an antenna assembly according to further embodiments of the present invention.
Figure 9B:
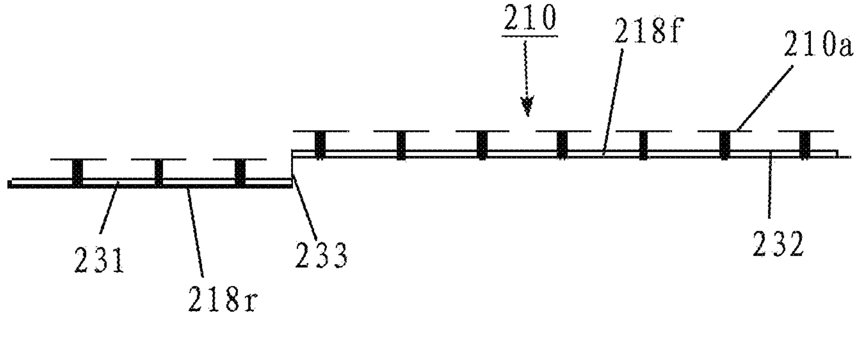

FIGS. 9A and 9B are a top view and side view of an antenna assembly 210 according to still further embodiments of the present invention. The antenna assembly 210 may be used as the main structural unit of the base station antenna accommodated in a housing (such as housing 11, 111, FIG. 1, 7) that is not shown. The antenna assembly 210 may comprise a reflector 218, which has a longitudinal extent $L_3$ and a lateral extent $W_3$. The reflector 218 may have a front side **218*f* and rear side 218*r* opposite the front side. First and second arrays of radiating elements 210*a* are mounted to extend forwardly from the front side 218*f* of the reflector 218**.

The reflector 218 may have a first longitudinal section 231 and a second longitudinal section 232 adjacent the first longitudinal section 231, where the first longitudinal section 231 is in a plane that is rearwardly offset relative to a plane of the second longitudinal section 232. The first longitudinal section 231 may be a longitudinal end section of the reflector 218. The first longitudinal section 231 may take up a sub-length of the reflector 218, for example, about 30-40%, of the longitudinal extent $L_3$ of the reflector 218. The first longitudinal section 231 may transition to the second longitudinal section 232 through a step segment 233 like that 33 as discussed above with respect to reflector 18. The longitudinal sections 231, 232 may be parallel to each other. As shown, the radiating elements **210*a* in the two arrays extend forwardly from both the first longitudinal section 231 and the second longitudinal section 232. In other words, each array spans both the first and second longitudinal sections 231, 232. The first longitudinal section 231** can be continuous in a lateral direction to define a continuous surface and sides and no window is included.

In this embodiment, the first longitudinal section 231 of the passive reflector 218 (or at least a portion thereof) can be configured to selectively reject (e.g., reflect) RF energy in some frequency ranges while permitting RF energy in other frequency ranges to pass therethrough by forming the first longitudinal section 231 of the passive reflector 218 as a frequency selective surface and/or substrate to operate as a type of "spatial filter". See, e.g., Ben A. Munk, Frequency Selective Surfaces: Theory and Design, ISBN: 978-0-471-37047-5; DOI: 10.1002/0471723770; April 2000, Copyright® 2000 John Wiley & Sons, Inc. the contents of which are hereby incorporated by reference as if recited in full herein. For additional discussion of example configurations of the frequency selective surface embodiments, see co-pending U.S. patent application Ser. No. 17/209,562 filed Mar. 23, 2021, the contents of which are hereby incorporated by reference as if recited in full herein. The frequency selective surface may be configured to reflect RF energy in the operating frequency range of the radiating elements **210*a***, so that the frequency selective surface will act as a reflector for those radiating elements. The frequency selective surface may be configured to substantially pass RF energy in the operating frequency range of the radiating elements of an array included in an active module of the antenna (not shown) so that RF energy emitted by the active radiating elements, which are positioned behind the frequency selective surface, may pass through the frequency selective surface and exit the front of the antenna.

Figure 10A:
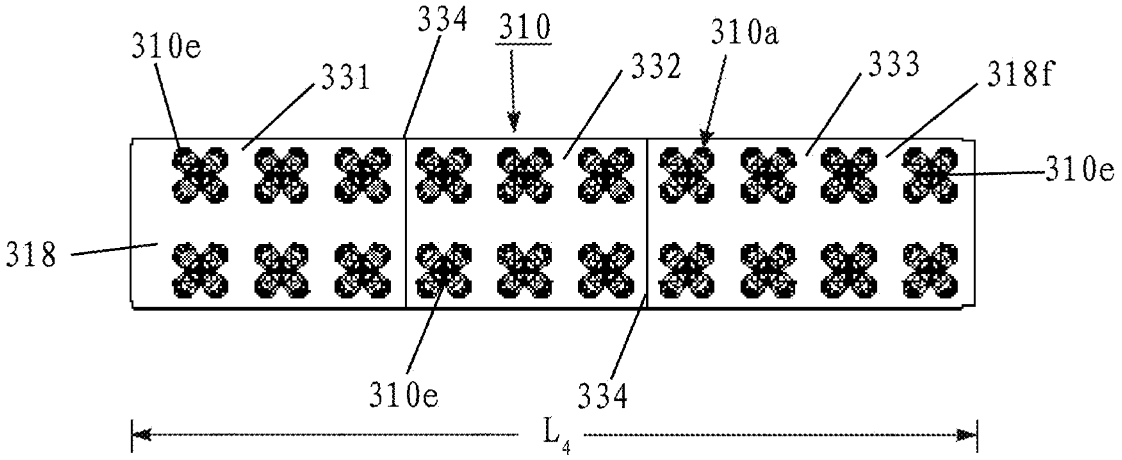
FIGS. 10A and 10B are a top view and a side view, respectively, of an antenna assembly according to yet additional embodiments of the present invention.
Figure 10B:
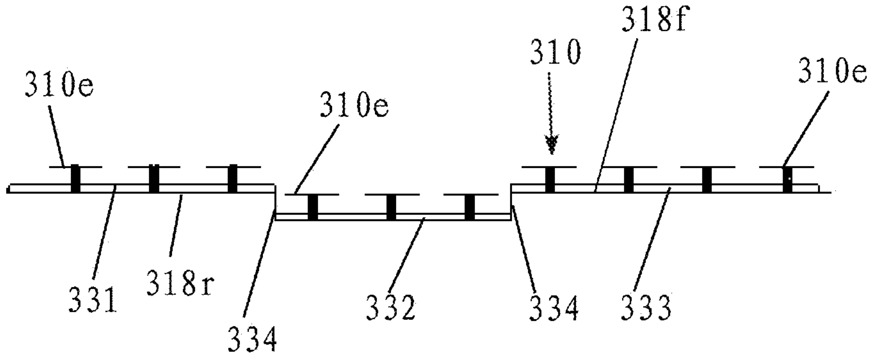

FIGS. 10A and 10B are a top view and side view of an antenna assembly 310 according to yet another embodiment of the present invention.

The antenna assembly 310 comprises a reflector 318, which has a longitudinal extent $L_4$. The reflector 318 may have a front side **318*f* and rear side 318*r* opposite the front side 318*f*. A pair of arrays of radiating elements 310*a* extend forwardly from the front side 318*f* of the reflector 318**.

The reflector 318 may have a first longitudinal section 332 residing between second and third longitudinal sections 331 and 333, respectively, adjacent the first longitudinal section 332, where the first longitudinal section 332 is in a plane that is offset in a rearward direction relative to a plane or planes corresponding to the second and third longitudinal sections 331, 333. The first longitudinal section 332 may be a longitudinal central section of the reflector 318 and the second and third longitudinal sections 331 and 333 may be opposing upper and lower end sections of the reflector 318. The first longitudinal section 332 may transition to the second longitudinal sections 331 and 333 through respective step segments 334. Thus, each longitudinal section 331, 332, 333 may extend in a plane. The longitudinal sections 331, 332, 333 may be parallel to each other. The second and third second longitudinal sections 331, 333 may be coplanar. Each longitudinal section 331, 332, 333 of the reflector may be arranged with at least one radiating element **310*e*. In FIGS. 10A and 10B, the first longitudinal section 331 does not include a window and may include a frequency selective surface, as discussed above with reference to the embodiment of FIGS. 9A-9B. It will be appreciated that in other embodiments a window may be provided in the first longitudinal section 331 in the manner described above with reference to the embodiment of FIGS. 4-6**.

While not shown in the drawings, it will be appreciated that in other embodiments, the first longitudinal section 332 shown in FIG. 10B may be positioned forwardly of the second and third longitudinal sections 331 and 333. Such a configuration may be appropriate when two active antenna modules are mounted to the antenna that includes the antenna assembly 310. In such embodiments, the two active antenna modules may be mounted behind the second and third longitudinal sections 331 and 333 so that the passive reflector would extend close to the active antenna modules.

In the antenna assemblies 10, 110, 210, 310, as the first longitudinal section 31, 131, 231, 332, is rearwardly offset in the front-to-back direction of the base station antenna 1 relative to the second longitudinal section 32, 132, 232, 331 (where the reflector can be described as a "stepped reflector"), and as compared to the situation where the reflector extends in a straight line (side view) in the longitudinal extent, the amplitude and phase of the radiating elements on the first longitudinal section change such that the electrical properties of the entire antenna assembly, for example, the front-to-back ratio, sector power ratio, and half power beam width, etc. can be improved.

The stepped passive reflectors 18, 118, 218, 318 can be configured to position the passive reflector segment that resides in front of the active antenna module 2 to be closer to the active reflector 22 of the active antenna module without requiring (or at least limiting the extent to which) the active antenna module 2 to be pushed forward into the base station antenna 1. The stepped passive reflector can advantageously compensate phase for a low band wavefront for low band radiating elements that are at different heights (different low band radiating elements can extend forward at different height dimensions from different reflector planes) so that a wavefront is compensated to be at the same phase across the antenna.

In some embodiments, a constant profile of the rear 11*r*, 111*r* of the housing over its longitudinal extent can be provided by the base station antenna 1 with the housings having extruded radomes with a common profile over an entire length which can provide in contrast to radomes with rear surfaces that step backward or forward at different positions substantial cost benefits in fabrication/manufacturing.

It will be understood that the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

That which is claimed:

1. A base station antenna, comprising:

a first radio frequency (RF) port;

a passive reflector having a first longitudinal section residing in a first plane and a second longitudinal section residing in a second plane with the first longitudinal section being above or below the second longitudinal section, wherein the first plane is offset from the second plane in a rearward direction, and wherein the offset is a distance in a range of 0.25 inches and 5 inches; and an antenna assembly configured with a first array of radiating elements that are all coupled to the first RF port, wherein a first subset of the radiating elements in the first array are mounted to project forward of the first longitudinal section and a second subset of the radiating elements in the first array are mounted to project forward of the second longitudinal section.

2. The base station antenna of claim 1, further comprising a second RF port, the antenna assembly further comprising a second array of radiating elements that are all coupled to the second RF port, wherein a first subset of the radiating elements in the second array are mounted to project forward of the first longitudinal section and a second subset of the radiating elements in the second array are mounted to project forward of the second longitudinal section, wherein the first subsets of the radiating elements in the respective first and second arrays comprise laterally spaced apart first and second columns of radiating elements on right and left side portions of the first longitudinal section, projecting in a forward direction, and the second subsets of the radiating elements in the respective first and second arrays comprise laterally spaced apart first and second columns of radiating elements on the second longitudinal section, projecting in the forward direction.

3. The base station antenna of claim 2, wherein the first and second arrays of radiating elements are configured to operate in all or part of the 617-960 MHz frequency band.

4. The base station antenna of claim 3, wherein the antenna assembly further comprises a plurality of radiating elements extending only along the second longitudinal section that are configured to operate in all or part of the 1427-2690 MHz frequency band.

5. The base station antenna of claim 1, wherein a major portion of a width dimension of the first longitudinal section is devoid of radiating elements.

6. The base station antenna of claim 1, wherein the first longitudinal section comprises a window that extends laterally between right and left side portions of the first longitudinal section and longitudinally along at least a major portion of a length extent of the first longitudinal section, and wherein the right and left side portions comprise radiating elements that project forward therefrom.

7. The base station antenna of claim 1, wherein the first longitudinal section is a longitudinal end section of the reflector that extends to a top end of the passive reflector and that extends for a longitudinal extent that is less than a longitudinal extent of the second longitudinal section.

8. The base station antenna of claim 1, wherein the first longitudinal section transitions to the second longitudinal section through a step segment that extends only in a straight lateral direction, in a plane that is orthogonal to and extending in a front to back direction between a primary surface of the first longitudinal section and a primary surface of the second longitudinal section.

9. The base station antenna of claim 1, wherein the first longitudinal section has a window extending between laterally spaced apart first and second edge slats that reside on opposing longitudinally extending sides of the window.

10. The base station antenna of claim 9, wherein the window extends only along a longitudinal extent of the first longitudinal section.

11. The base station antenna of claim 9, wherein the window extends along at least a major portion of a length of only the first longitudinal section.

12. The base station antenna of claim 11, wherein the window extends laterally over at least a major portion of a width of the first longitudinal section.

13. The base station antenna of claim 9, wherein some of the radiating elements of the first column of radiating elements extend forwardly of the first edge slat and some of the radiating elements of the second column of radiating elements extend forwardly of the second edge slat.

14. The base station antenna of claim 9, further comprising a housing enclosing the passive reflector and a dielectric layer inside the housing and extending across at least a portion of the window.

15. A base station antenna, comprising:

a first radio frequency (RF) port;

a passive reflector having a first longitudinal section residing in a first plane and a second longitudinal section residing in a second plane, wherein the first plane is offset from the second plane in a rearward direction;

a first array of radiating elements that are coupled to the first RF port, wherein at least some of the radiating elements in the first array are mounted to extend forwardly from the first longitudinal section of the reflector; and an active antenna module that includes an active reflector and an array of active radiating elements extending forwardly from the active reflector, wherein the active reflector is substantially coplanar with the first longitudinal section of the passive reflector.

16. The base station antenna of claim 15, wherein others of the radiating elements in the first array are mounted to extend forwardly from the second longitudinal section of the passive reflector.

17. The base station antenna of claim 15, wherein the active antenna module is mounted behind the first longitudinal section of the passive reflector.

18. The base station antenna of claim 15, wherein the active reflector is electrically coupled to the passive reflector.

19. The base station antenna of claim 18, wherein the active reflector is coupled to the passive reflector through a frame that is used to mount the active antenna module to the base station antenna.

20. The base station antenna of claim 15, wherein the first longitudinal section of the passive reflector includes a window, and wherein the active radiating elements extend forwardly from the active reflector to pass at least partially through the window.

* * * * *